Oct. 12, 1926.
G. C. BATZ
SPRING CLIP
Filed July 24, 1925
1,602,387
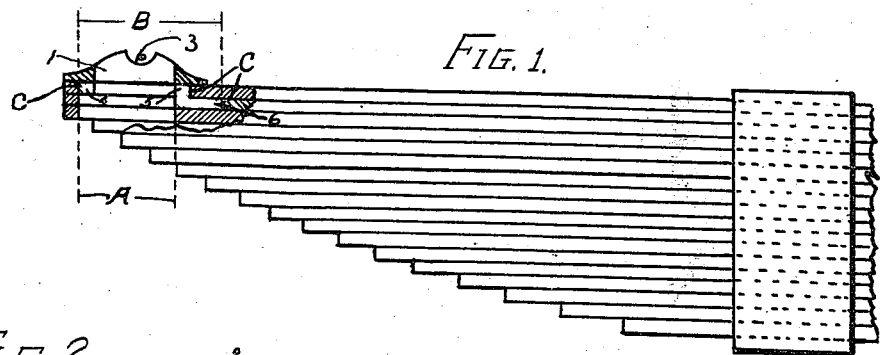
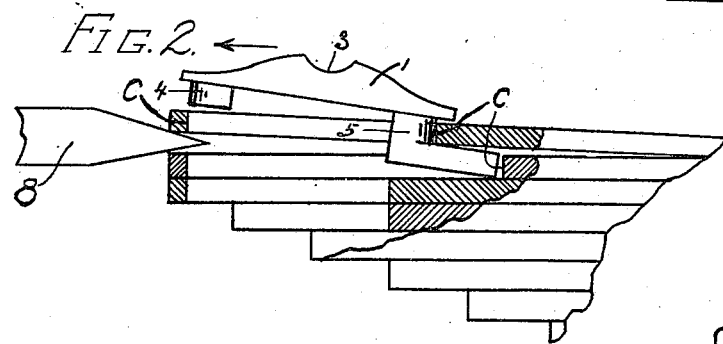
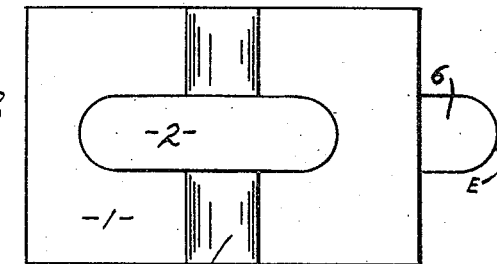
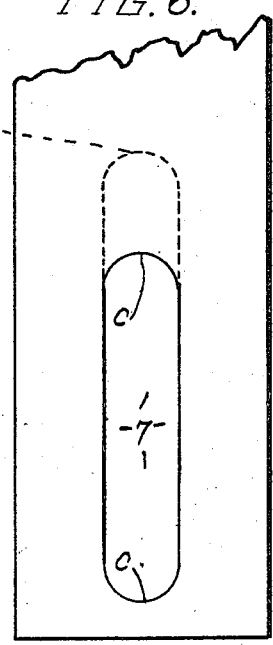
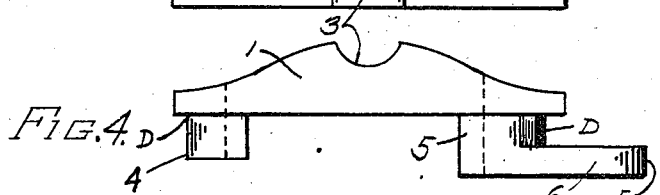
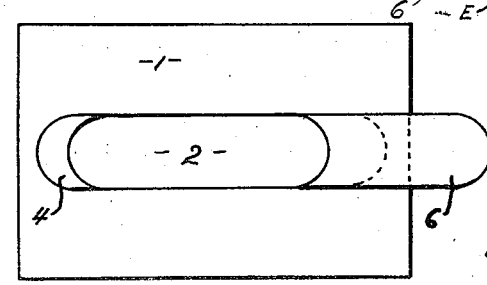
INVENTOR.
GEORGE C. BATZ.
U. G. Charles
ATTORNEY.

Patented Oct. 12, 1926.

1,602,387

UNITED STATES PATENT OFFICE.

GEORGE C. BATZ, OF TOPEKA, KANSAS.

SPRING CLIP.

Application filed July 24, 1925. Serial No. 45,836.

My invention relates to spring clips, such as used on railroad locomotives.

The object of my invention is to provide a clip, relieving the side thrust from the extreme end of the spring leaves.

A further object of my invention is to provide a clip that is not fastened permanently to the leaves of the spring.

A still further object of my invention is to provide a clip that will engage with the top leaf of the spring, and can be removed without disassembling.

A still further object of my invention is to provide a clip made in such a way that the slot in the spring leaf will not sever the end of the spring.

Referring to the drawings;

Fig. 1, is a side elevation of a portion of a spring, parts removed for convenience of illustration.

Fig. 2, is an enlarged detail showing the method of removing the plate.

Figures 3, 4, and 5, are enlarged detailed views of the clip, Fig. 3, being the top, Fig. 4 the side, and Fig. 5 a bottom view.

Fig. 6 is an enlarged plan view of the spring slots.

The clip consists of a rectangular body 1, having a slot 2, centrally disposed therein, and on the top side is a hanger seat 3, on which the load is imposed. 4 is a lug on one end of the clip extending downward to approximately the thickness of one of the leaves of the spring, and on the opposite end of the body is a lug 5, extending downward equal to the thickness of two leaves of the spring, and latterly extending from the end of said lug is a tongue 6, the said tongue adapted to engage in a slot 7 in the second leaf from the top of the spring proper.

To install my clip, a slot is cut through the ends of the leaves of the spring, so that the pendant of a hanger will engage therethrough. The said slot being in length as shown by dotted lines A, in Fig. 1, and the width equalled to the slot in the clip as shown in Figures 3 and 5. This will accommodate for oscillation of the hanger, (the hanger not shown in the drawings). When the clip is properly installed, the position will be same as that shown in Fig. 1, and note that the slot in the second leaf is greater in length than those in adjacent leaves. The same being shown by dotted lines as at B, in Fig. 1, and by dotted lines in Fig. 6.

When the thrust occurs, the load is imposed on the springs in the ends of the slots as at C, engaging the lugs at D, and the tongue at E.

Heretofore, a clip was made, and employed, having a lip turned downward over the end of the spring, and the end of the spring being slotted through, weakened the spring at that point very materially, and when the side thrust would occur, the end of the spring would break quite often on one side or the other of the slot. By my invention I have overcome the break at this point, as the thrust engages the stronger part of the spring, and the slot does not extend through the end, which adds additional strength.

To remove or place the clip, a tool 8 is driven between the two top leaves of the spring, as shown in Fig. 2, this separation of the springs will allow the angle required for the tongue, so that the outer end may be lifted, then drawn in the direction of the arrow and removed, and a like process when replacing.

I do not confine my clip to locomotive springs alone, as it may be applied to springs for other purposes, and the clip may be modified engaging a greater number of the leaves of the spring, and other modifications may be employed as lies within the scope of the appended claim.

Having thus described my invention, what I claim as new and desire to secure by Letters Patent is:—

In a spring clip, the combination of a clip, a main leaf and a second leaf of a semi-elliptic spring, a slot in the end of the main leaf of the spring, a slot in the end of the second leaf of the spring, last said slot being longer and extending inward further than first said slot, the side walls of said slots being straight and in registry with each other, a lug on the outer end of the clip, said lug downwardly extending to the thickness of the main leaf of the spring, a lug on the opposite end of the clip, last said lug downwardly extending to the thickness of the main and second leaves of the spring, a tongue laterally extending from last said lug and being integral therewith, the said lugs engaging snugly in the ends of the slot in the main leaf of the spring, and the said tongue adapted to slidably engage in the slot of the second leaf of the spring, all substantially as shown and for the purpose specified.

GEO. C. BATZ.